US012439970B2

(12) United States Patent
Zhou et al.

(10) Patent No.: US 12,439,970 B2
(45) Date of Patent: Oct. 14, 2025

(54) AEROSOL GENERATING DEVICE AND ELECTROMAGNETIC HEATING ASSEMBLY THEREOF

(71) Applicant: SHENZHEN SMOORE TECHNOLOGY LIMITED, Guangdong (CN)

(72) Inventors: Hongming Zhou, Shenzhen (CN); Taowen Liu, Shenzhen (CN); Junjie Xiao, Shenzhen (CN); Hua Chen, Shenzhen (CN); Wenli Du, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 305 days.

(21) Appl. No.: 17/934,936

(22) Filed: Sep. 23, 2022

(65) Prior Publication Data

US 2023/0015720 A1 Jan. 19, 2023

Related U.S. Application Data

(63) Continuation of application No. PCT/CN2021/077111, filed on Feb. 20, 2021.

(30) Foreign Application Priority Data

Mar. 26, 2020 (CN) ........................ 202020412900.8

(51) Int. Cl.

| | |
|---|---|
| ***A24F 40/465*** | (2020.01) |
| ***A24F 40/20*** | (2020.01) |

(Continued)

(52) U.S. Cl.

CPC ............ *A24F 40/465* (2020.01); *A24F 40/20* (2020.01); *A24F 40/485* (2020.01); *H05B 6/105* (2013.01); *H05B 6/36* (2013.01)

(58) Field of Classification Search

None

See application file for complete search history.

(56) References Cited

U.S. PATENT DOCUMENTS

| | | | | |
|---|---|---|---|---|
| 2019/0124979 | A1* | 5/2019 | Sebastian | A24D 1/20 |
| 2019/0191767 | A1* | 6/2019 | Wu | H05B 6/105 |

FOREIGN PATENT DOCUMENTS

| | | |
|---|---|---|
| CN | 104470387 A | 3/2015 |
| CN | 108323824 A | 7/2018 |

(Continued)

OTHER PUBLICATIONS

Patent Cooperation Treaty, International Search Report, International Application No. PCT/CN2021/077111 (May 21, 2021).

(Continued)

*Primary Examiner* — Phu H Nguyen

(74) *Attorney, Agent, or Firm* — Leydig, Voit & Mayer, Ltd.

(57) ABSTRACT

An electromagnetic heating assembly includes: a fixing tube with two run-through ends for fixing an aerosol-forming substrate; a heating body at least partially extending from a first end of the fixing tube into the fixing tube and inserted into the aerosol-forming substrate in the fixing tube; and an induction coil sleeved on a periphery of the fixing tube for generating electromagnetic induction under an energized state so as to cause the heating body to heat. A ratio of a total height of the induction coil to a depth by which the heating body is inserted into the aerosol-forming substrate in the fixing tube ranges from 1:1 to 3:1.

15 Claims, 6 Drawing Sheets

(51) Int. Cl.

| | |
|---|---|
| ***A24F 40/485*** | (2020.01) |
| ***H05B 6/10*** | (2006.01) |
| ***H05B 6/36*** | (2006.01) |

(56) References Cited

FOREIGN PATENT DOCUMENTS

| | | | |
|---|---|---|---|
| CN | 207754554 | U | 8/2018 |
| CN | 207754555 | U | 8/2018 |
| CN | 207766584 | U | 8/2018 |
| CN | 108601397 | A | 9/2018 |
| CN | 108617042 | A | 10/2018 |
| CN | 110122928 | A | 8/2019 |
| CN | 110169594 | A | 8/2019 |
| CN | 212233104 | U | 12/2020 |
| EP | 3549462 | A1 | 10/2019 |
| WO | 2019030170 | A1 | 2/2019 |

OTHER PUBLICATIONS

Patent Cooperation Treaty, Written Opinion of the International Searching Authority, International Application No. PCT/CN2021/077111 (May 21, 2021).
European Patent Office, Search Report in European Patent Application No. 21776842.3 (Aug. 24, 2023).

* cited by examiner

AEROSOL GENERATING DEVICE AND ELECTROMAGNETIC HEATING ASSEMBLY THEREOF

CROSS-REFERENCE TO PRIOR APPLICATION

This application is a continuation of International Patent Application No. PCT/CN2021/077111, filed on Feb. 20, 2021, which claims priority to Chinese Patent Application No. 202020412900.8, filed on Mar. 26, 2020. The entire disclosure of both applications is hereby incorporated by reference herein.

FIELD

The present application relates to heating cigarette devices, and more specifically, to an aerosol generation device and an electromagnetic heating assembly thereof.

BACKGROUND

As an emerging technology, an aerosol generation device replaces a conventional burnt cigarette with heated e-liquid or a low-temperature cigarette and has a low working temperature, and harmful components in vapor generated by the aerosol generation device are far less than that of the conventional burnt cigarette, so that negative impact of cigarettes on a human body can be greatly avoided by the aerosol generation device. Therefore, the aerosol generation device becomes a healthier smoking manner.

At present, an aerosol generation device on the mark includes an electromagnetic heating assembly. The electromagnetic heating assembly heats a surrounding tubular heating body through electromagnetic induction, an aerosol-forming substrate is inserted in the tube, and an air layer is provided outside the tube for heat insulation. As a result, after 3 aerosol-forming substrates are continuously inhaled, due to accumulated radiant heat, a surface temperature of a cigarette device is too high to be used continuously.

SUMMARY

In an embodiment, the present invention provides an electromagnetic heating assembly, comprising: a fixing tube with two run-through ends configured to fix an aerosol-forming substrate; a heating body at least partially extending from a first end of the fixing tube into the fixing tube and inserted into the aerosol-forming substrate in the fixing tube; and an induction coil sleeved on a periphery of the fixing tube and configured to generate electromagnetic induction under an energized state so as to cause the heating body to heat, wherein a ratio of a total height of the induction coil to a depth by which the heating body is inserted into the aerosol-forming substrate in the fixing tube ranges from 1:1 to 3:1.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
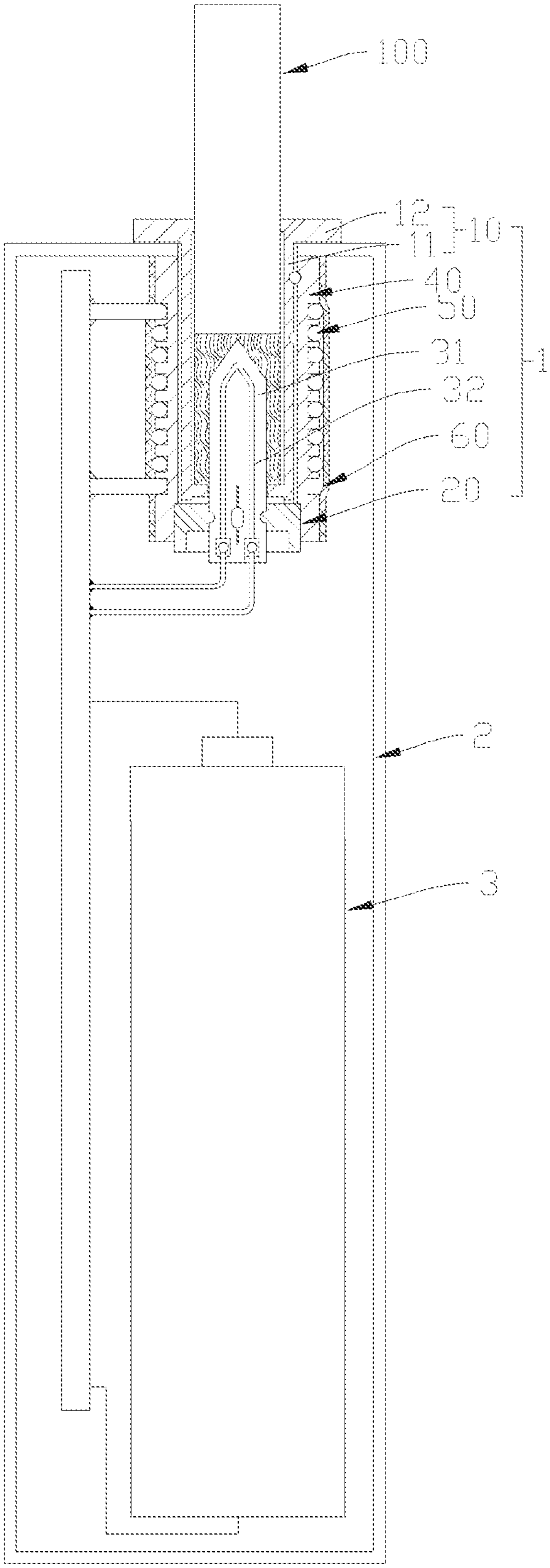
FIG. 1 is a cross-sectional view of an aerosol generation device according to some embodiments of the present application.

In an embodiment, the present invention provides an improved aerosol generation device and an electromagnetic heating assembly thereof.

In an embodiment, the present invention provides an electromagnetic heating assembly, including: a fixing tube with two run-through ends to fix an aerosol-forming substrate, a heating body at least partially extending from a first end of the fixing tube into the fixing tube and inserted into the aerosol-forming substrate in the fixing tube, and an induction coil sleeved on a periphery of the fixing tube to generate electromagnetic induction under an energized state so as to cause the heating body to heat, where a ratio of a total height of the induction coil to a depth by which the heating body is inserted into the aerosol-forming substrate in the fixing tube ranges from 1:1 to 3:1.

Preferably, the ratio of the total height of the induction coil to the depth by which the heating body is inserted into the aerosol-forming substrate in the fixing tube ranges from 1.2:1 to 1.5:1.

Preferably, the heating body is in a shape of a sheet;

the induction coil is in a shape of a spiral; and a ratio of an inner diameter of the induction coil to a width of the heating body ranges from 1.2:1 to 3:1.

Preferably, the induction coil includes a first sensing region, a second sensing region, and a third sensing region that are arranged sequentially toward the first end of the fixing tube;

an average inter-turn spacing of the first sensing region is greater than an average inter-turn spacing of the third sensing region; and the average inter-turn spacing of the third sensing region is greater than an average inter-turn spacing of the second sensing region.

Preferably, the electromagnetic heating assembly further includes a coil fixing cylinder sleeved outside the fixing tube to fix the induction coil, where the induction coil is wound on the coil fixing cylinder.

Preferably, a plurality of positioning grooves for winding the induction coil to define an inter-turn spacing of the induction coil are provided on an outer side wall of the coil fixing cylinder.

Preferably, the electromagnetic heating assembly further includes a protective film arranged on a periphery of the induction coil and configured to increase an inductance and prevent magnetic leakage.

Preferably, a height of the protective film is greater than the total height of the induction coil.

Preferably, the height of the protective film matches a height of the coil fixing cylinder.

Preferably, a magnetic permeability of the protective film ranges from 500 to 2,000.

Preferably, a thickness of the protective film ranges from 0.1 mm to 0.5 mm.

Preferably, the protective film is a ferrite film.

Preferably, the electromagnetic heating assembly further includes a base arranged on the first end of the fixing tube and configured to mount the heating body.

Preferably, the fixing tube includes a tube body with two run-through ends to fix the aerosol-forming substrate;

the tube body includes a first end for the heating body to penetrate and a second end for the aerosol-forming substrate to pass through;

an engagement portion arranged protruding out of a peripheral wall of the tube body to engage with the coil fixing cylinder is arranged on the second end of the tube body;

a gap between the coil fixing cylinder and the engagement portion forms a first air inlet;

a second air inlet is provided on the peripheral wall of the tube body close to the first end; and an air inlet channel in communication with the first air inlet and the second air inlet is provided on an inner side of the coil fixing cylinder.

The present application further constructs an aerosol generation device, including a shell, the electromagnetic heating assembly according to the present application and arranged in the shell, and a power supply component arranged in the shell to energize the electromagnetic heating assembly.

Beneficial Effect

The following beneficial effects may be obtained by implementing the aerosol generation device and the electromagnetic heating assembly of the present application: According to the electromagnetic heating assembly, the ratio of the total height of the induction coil to the depth by which the heating body is inserted into the aerosol-forming substrate in the fixing tube is set to range from 1:1 to 3:1, so that distribution of a high temperature region on the heating body can be adjusted, thereby preventing the heating body from being non-available due to an excessively high temperature and further improving the user experience.

In order to have a clearer understanding of the technical features, the objectives, and the effects of the present application, specific implementations of the present application are now illustrated in detail with reference to the accompanying drawings.

It should be understood that, the terms such as “front”, “rear”, “left”, “right”, “upper”, “lower”, “first”, and “second” are used only for ease of describing the technical solutions of the present application, rather than indicating or implying that the mentioned apparatus or component must have a particular difference. Therefore, such terms should not be construed as a limitation to the present application. It should be noted that, when a component is considered to be “connected to” another component, the component may be directly connected to the another component, or an intervening component may be present. Unless otherwise defined, meanings of all technical and scientific terms used in this specification are the same as that usually understood by a person skilled in the technical field to which the present application belongs. In this specification, terms used in this specification of the present application are merely intended to describe objectives of the specific embodiments, but are not intended to limit the present application.

Figure 2:
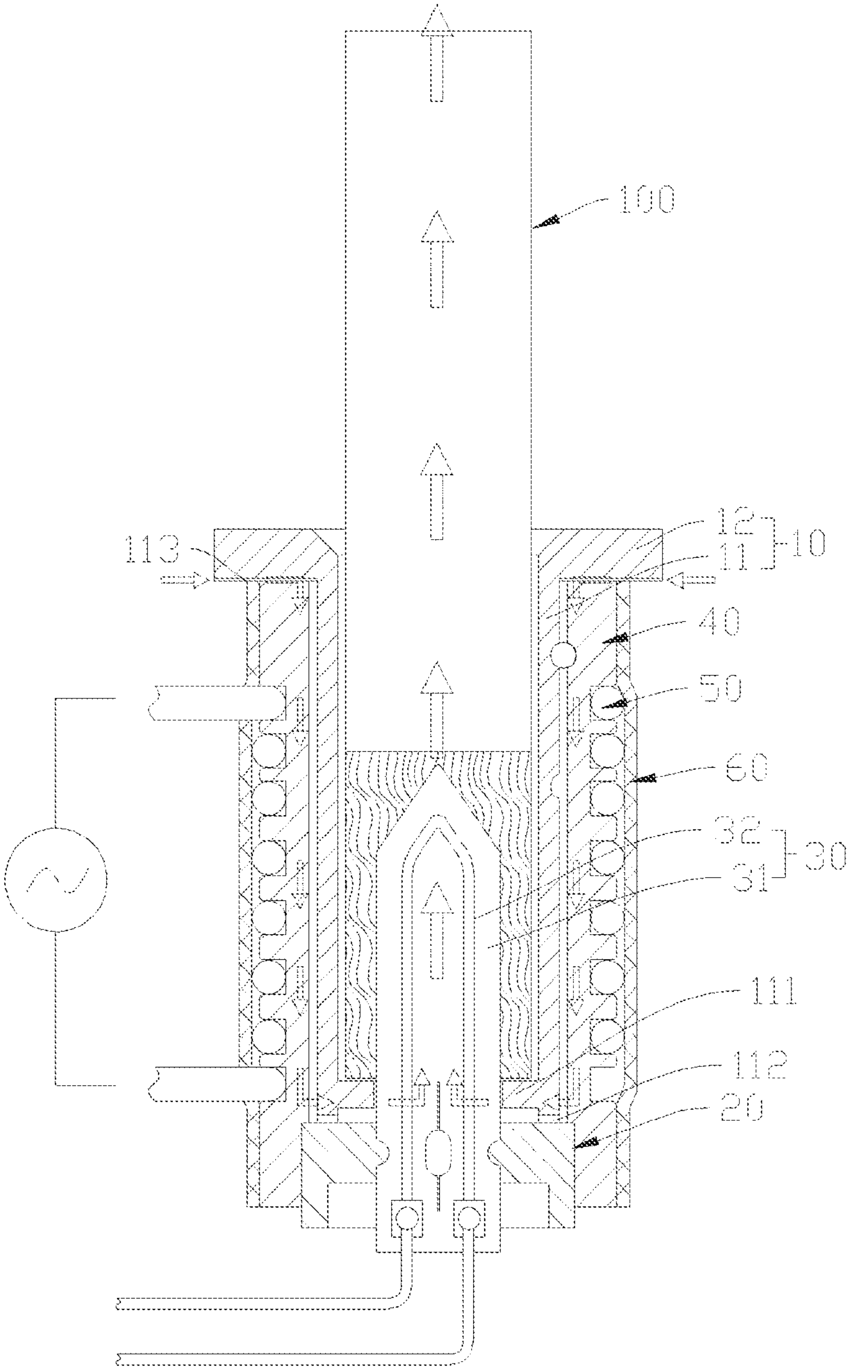
FIG. 2 is a cross-sectional view of an electromagnetic heating assembly shown in FIG. 1.

FIG. 1 and FIG. 2 show some preferred embodiments of an aerosol generation device of the present application. The aerosol generation device is a heat-not-burn cigarette device, which may heat components in an aerosol-forming substrate 100 through electromagnetic induction. In some embodiments, the aerosol-forming substrate 100 may be a cigarette. The aerosol generation device includes an electromagnetic heating assembly 1, a shell 2, and a power supply component 3. The electromagnetic heating assembly 1 is arranged in the shell 2 and is mechanically and electrically connected to the power supply component 3. The power supply component 3 is installed in the shell 2 and configured to energize the electromagnetic heating assembly 1, to supply power to the electromagnetic heating assembly 1.

Figure 3:
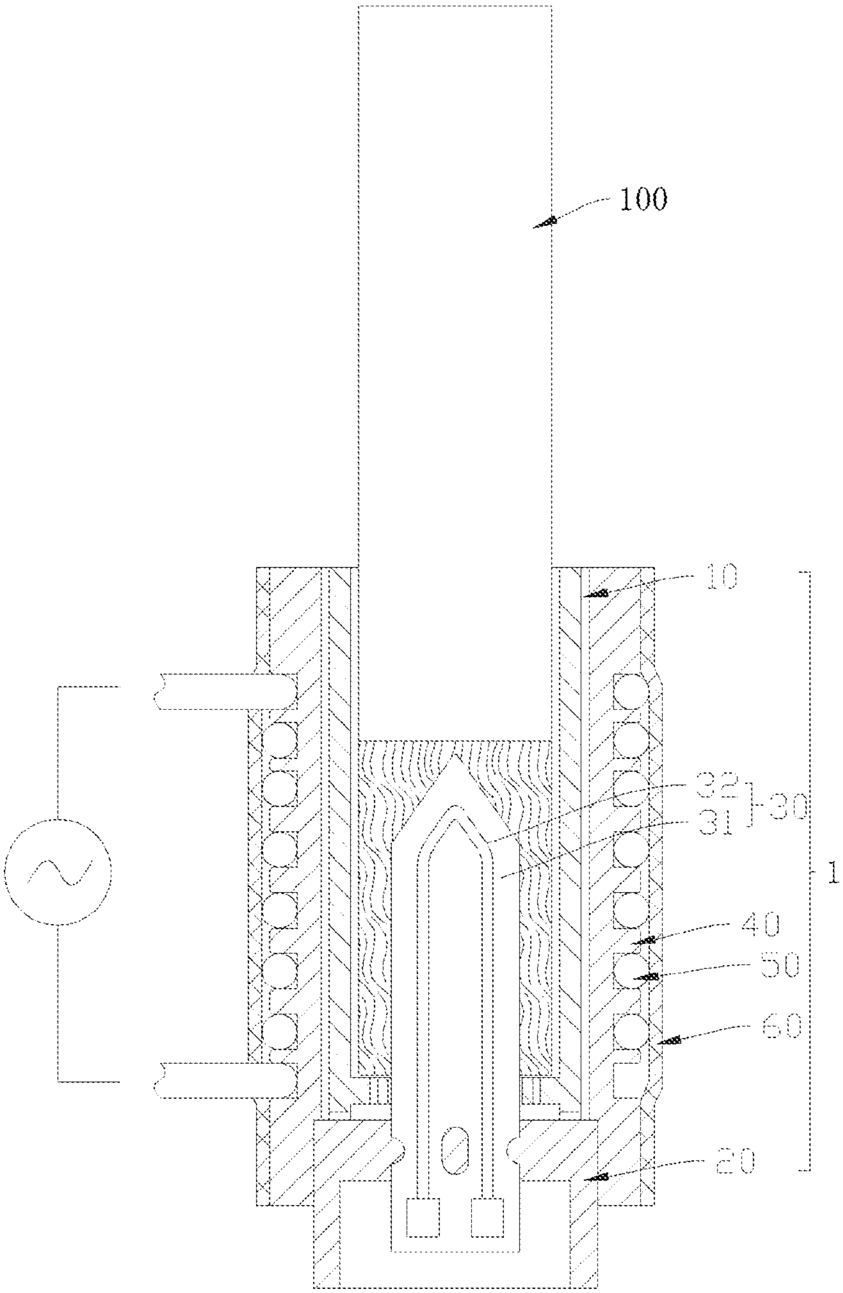
FIG. 3 is a schematic partial structural diagram of the electromagnetic heating assembly shown in FIG. 1.

Further, as shown in FIG. 2 and FIG. 3, the electromagnetic heating assembly includes a fixing tube 10, a base 20, a heating body 30, a coil fixing cylinder 40, and an induction coil 50. Two ends of the fixing tube 10 are provided in a run-through manner. The fixing tube is configured to fix an aerosol-forming substrate 100, and the fixing tube includes a first end and a second end. It should be noted that, the first end is an end for the heating body to penetrate, and the second end is an end for the aerosol-forming substrate 100 to penetrate and pass through. The base 20 is arranged on the second end of the fixing tube 10 and is configured to mount the heating body 30. The heating body 30 at least partially extends from the first end of the fixing tube 10 into the fixing tube 10 and is inserted into the aerosol-forming substrate 100 in the fixing tube 10 in an axial direction of the fixing tube 10, to heat and vaporize components in the aerosol-forming substrate 100. The coil fixing cylinder 40 is sleeved outside the fixing tube 10, which is a hollow structure with two run-through ends and is configured to fix the induction coil 50. The induction coil 50 is sleeved on a periphery of the fixing tube 10 and is located at a middle position of the fixing tube 10. Specifically, the induction coil 50 is wound outside the coil fixing cylinder 40 and generates electromagnetic induction under an energized state to cause the heating body 30 to generate heat.

Further, in some embodiments, the fixing tube 10 is a hollow structure and includes a tube body 11. The tube body 11 is in a shape of a column with two run-through ends and is arranged in the shell 2 in a longitudinal direction. An inner diameter of the tube body matches an outer diameter of the aerosol-forming substrate 100, and the tube body is configured to fix the aerosol-forming substrate 100. In some embodiments, the tube body 11 includes a first end and a second end. The first end is provided for the heating body 30 to penetrate; and the second is provided for the aerosol-forming substrate 100 to pass through. It should be noted that, the first end of the fixing tube 10 is the first end of the tube body 11; and the second end of the fixing tube 10 is the second end of the tube body 11. In some embodiments, a bottom wall 111 may be provided on an inner side of the tube body 11 close to the first end thereof. A via hole for the heating body 30 to pass through may be provided on the bottom wall 111, and an air inlet hole for an airflow to enter may also be provided on the bottom wall 111. In some embodiments, a second air inlet 112 is provided on a peripheral wall of the tube body 11 close to the first end thereof, and the second air inlet 112 is in communication with the air inlet hole and is configured to transport air to the air inlet hole. An engagement portion 12 is arranged on the second end of the tube body 11. The engagement portion 12 is arranged on the peripheral wall of the tube body 11 and is arranged protruding out of the peripheral wall of the tube body 11, which is configured to engage with the coil fixing cylinder 40. A gap between the engagement portion and the coil fixing cylinder 40 form a first air inlet 113. The first air inlet 113 and the second air inlet 112 are in communication through the coil fixing cylinder 40. It may be understood that, in some embodiments, the engagement portion 12 may be omitted.

Further, in some embodiments, the base 20 is in a shape of a column and is detachably connected to the fixing tube 10. The base 20 includes a top wall and a side wall. An insertion hole is provided on the top wall of the base 20, and the insertion hole is for insertion to the heating body 30.

Further, in some embodiments, the heating body 30 is in a shape of an elongated sheet. It may be understood that, in some other embodiments, the shape of the heating body is not limited to an elongated sheet, but may be a column or a needle. A spire structure is provided on an end of the heating body away from the base 20, and the spire structure is in a shape of a triangle, a wedge, or a cone. The heating body includes a base body 31 and a temperature measuring resistance circuit 32 arranged on the base body 31. The base body 31 is in a shape of a sheet and is made of a magnetically conductive and electrically conductive material. The magnetically conductive and electrically conductive material may be one or more of iron, iron alloy, nickel, nickel alloy, graphite, or iron oxide. The base body is electrically conductive and includes a magnetic induction effect, so that the base body can generate eddy currents to generate heat, after the induction coil 50 releases electromagnetic energy under an energized state, to heat the components in the aerosol-forming substrate 100. The temperature measuring resistance circuit 32 is laid on a surface of the base body 31 and may be integrally formed with the base body 31. Specifically, an insulting layer may be printed on the surface of the base body 31, and the temperature measuring resistance circuit 32 may be arranged on the insulating layer. Currents may be conducted to two ends of the temperature measuring resistance circuit, and a temperature of the base body 31 may be obtained in real time according to a resistance change. It may be understood that, in some other embodiments, the temperature measuring resistance circuit 32 may be omitted.

As shown in FIG. 3 to FIG. 6, in some embodiments, the coil fixing cylinder 40 is in a shape of a column, where an inner diameter of the coil fixing cylinder may be slightly greater than an outer diameter of the fixing tube 10, and an air inlet channel may be provided on an inner side of the coil fixing cylinder. The air inlet channel is in communication with the first air inlet and the second air inlet 112, to help air enter the fixing tube 10. A plurality of positioning grooves are provided on an outer side wall of the coil fixing cylinder 40, and the plurality of positioning grooves are spaced in an axial direction of the coil fixing cylinder 40 and are provided in a manner of extending along a circumferential direction of the coil fixing cylinder 40. The positioning groove is provided for winding the induction coil 50 and can prevent the induction coil 50 from falling out of the coil fixing cylinder 40, thereby resolving a problem that an induction coil 50 formed by high-frequency Litz wires (a plurality of extremely small enameled wires) is too flexible to be positioned. In some embodiments, the positioning groove can further define an inter-turn spacing of the induction coil 50, to accurately control the inter-turn spacing of the induction coil 50. In addition, an area of the induction coil 50 attached to a cylinder wall can be maximized, and an effect of reducing magnetic leakage and improving the energy conversion efficiency can be further achieved.

Figure 4:
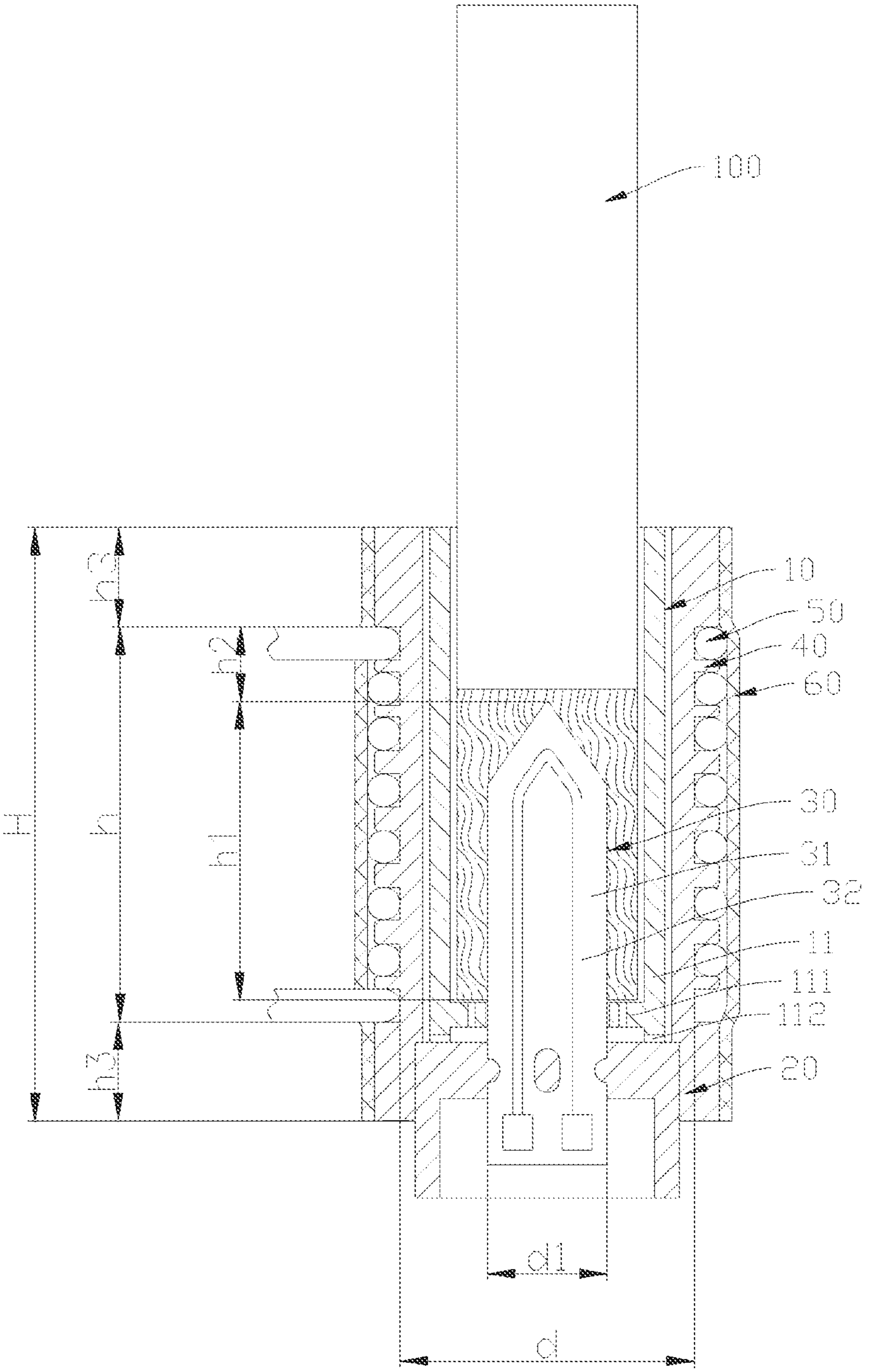
FIG. 4 is a schematic diagram of a proportional relationship of the electromagnetic heating assembly shown in FIG. 1.

As shown in FIG. 4, further, in some embodiments, the induction coil 50 is made of high-frequency Litz wires (a plurality of extremely small enameled wires) and is in a shape of a spiral, which is wound on the positioning grooves 41 of the coil fixing cylinder 40. In some embodiments, a ratio of a total height h of the induction coil 50 to a depth h1 by which the heating body 30 is inserted into the aerosol-forming substrate 100 in the fixing tube 10 ranges from 1:1 to 3:1. That is, h/h1 ranges from 1:1 to 3:1. In a case that an input power of the induction coil 50 is unchanged, distribution of a high temperature region on the heating body 30 can be learned according to the relationship equation. A smaller ratio indicates a small high temperature region on the heating body 30, and a higher and concentrated temperature of the high temperature region in this case; and a larger ratio indicates a larger high temperature region and more scattered temperature. A user may adjust the distribution of the high temperature region on the heating body correspondingly according to the relationship equation, to further prevent the heating body from being non-available due to an excessively high temperature, thereby improving the user experience. In some embodiments, optionally, the ratio of the total height h of the induction coil 50 to the depth h1 by which the heating body 30 is inserted into the aerosol-forming substrate 100 in the fixing tube 10 ranges from 1.2:1 to 1.5:1. That is, h/h1 ranges from 1.2:1 to 1.5:1. In some embodiments, a value of the depth h1 by which the heating body 30 is inserted into the aerosol-forming substrate 100 in the fixing tube 10 may range from 9 mm to 15 mm.

Further, in some embodiments, a ratio of an inner diameter d of the induction coil 50 to a width d1 of the heating body 30 may range from 1.2:1 to 3:1. That is, d/d1 ranges from 1.2:1 to 3:1, and the relationship equation decides changes of the heating efficiency. A smaller ratio of the inner diameter d of the induction coil 50 to the width d1 of the heating body 30 indicates a higher heating efficiency. In some embodiments, a value of d1 ranges from 3 mm to 5.5 mm.

Figure 5:
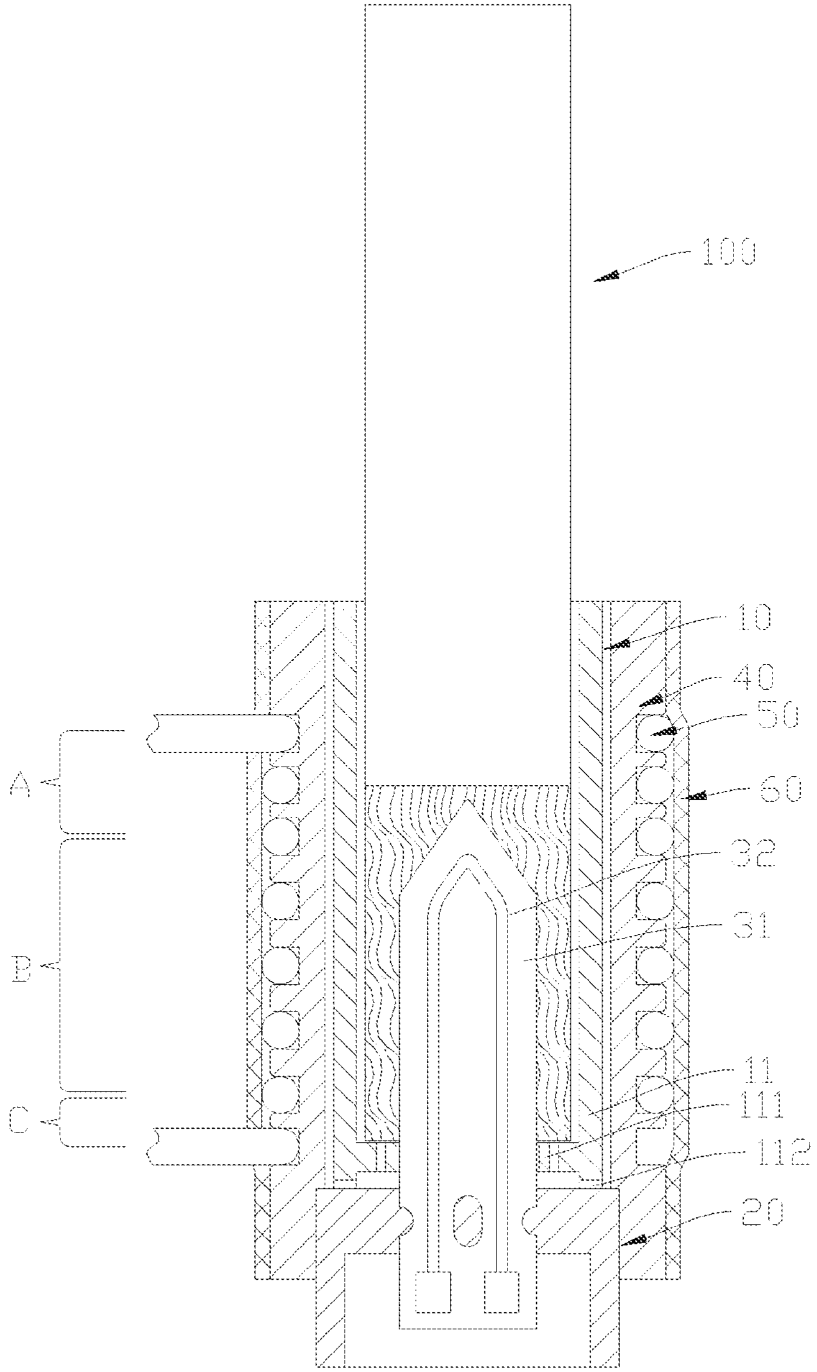
FIG. 5 is a schematic diagram of distribution of sensing regions of the electromagnetic heating assembly shown in FIG. 1.
Figure 6:
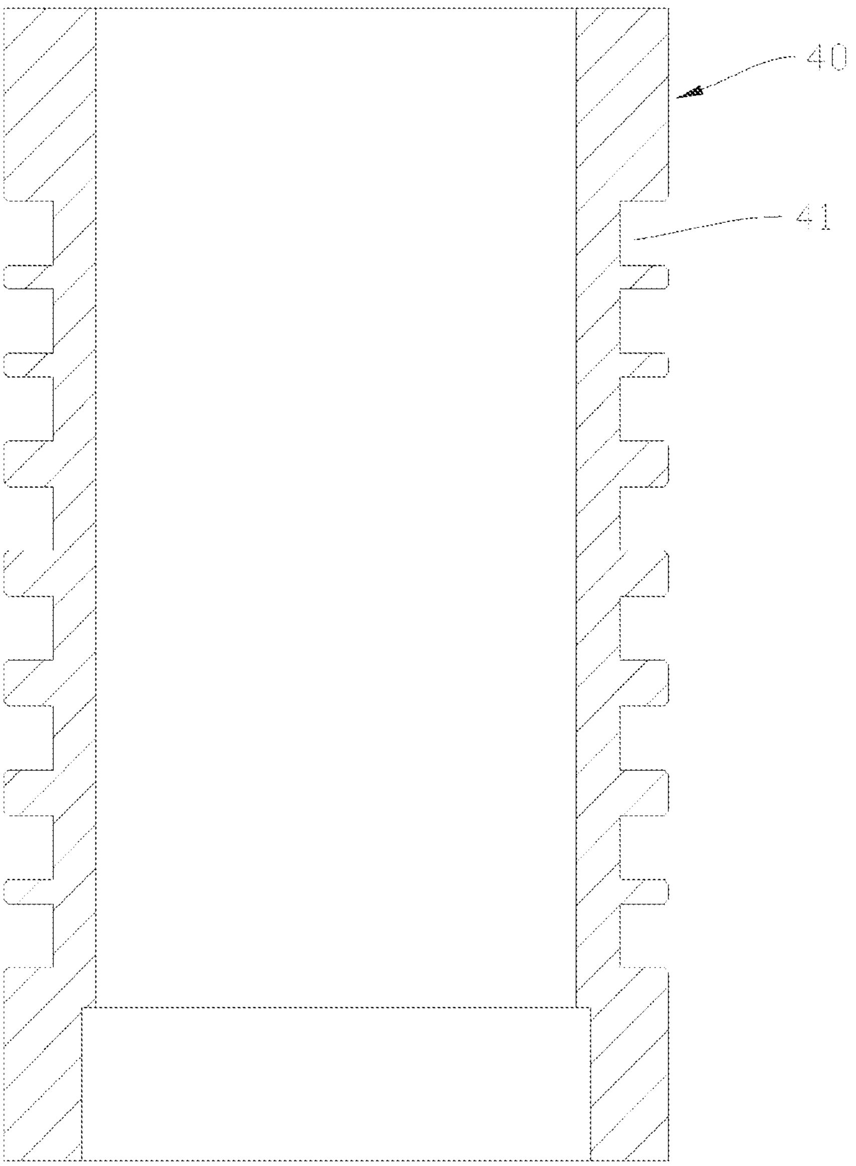
FIG. 6 is a cross-sectional view of a coil fixing cylinder of the electromagnetic heating assembly shown in FIG. 1.

As shown in FIG. 5, further, in some embodiments, the induction coil 50 may include a first sensing region A, a second sensing region B, and a third sensing region C. The first sensing region A, the second sensing region B, and the third sensing region C are provided sequentially toward the first end of the fixing tube 10. An average inter-turn spacing of the first sensing region A is greater than an average inter-turn spacing of the third sensing region C, and the average inter-turn spacing of the third sensing region C is greater than an average inter-turn spacing of the second sensing region B, so that the numbers of magnetic lines passing through the regions of the heating body 30 are the same, and temperature field distribution is more uniform. Correspondingly, the number of positioning grooves 41 per unit height in a region provided corresponding to the first sensing region A on the coil fixing cylinder 40 is greater than the number of positioning grooves 41 per unit height in a region provided corresponding to the third sensing region C on the coil fixing cylinder 40; and Correspondingly, the number of positioning grooves 41 per unit height in the region provided corresponding to the third sensing region C on the coil fixing cylinder 40 is greater than the number of positioning grooves 41 per unit height in a region provided corresponding to the second sensing region B on the coil fixing cylinder 40.

Still referring to FIG. 4, in some embodiments, the electromagnetic heating assembly further includes a protective film 60. The protective film 60 is arranged on a periphery of the induction coil 50. Specifically, the protective film is wrapped on the periphery of the induction coil 50, and is configured to increase an inductance, improve a heating speed, and prevent magnetic leakage from affecting operation of electronic components and causing damage to a human body. The protective film 60 may be in a shape of a column, and a height thereof is greater than the total height of the induction coil 50. Specifically, the height of the protective film matches a height of the coil fixing cylinder 40. In some embodiments, the height H of the protective film 60 is equal to h+2h3, where a value of h3 ranges from 0.5 mm to 6 mm. In some embodiments, the protective film 60 is a ferrite film and a material thereof is manganese-zinc ferrite. Certainly, it may be understood that, in some other embodiments, the protective film 60 is not limited to the manganese-zinc ferrite material, and may be formed by ferric oxide with one or more of other metal oxides (for example, nickel oxide, zinc oxide, manganese oxide, magnesium oxide, barium oxide, and strontium oxide) through preparation and sintering. In some embodiments, a magnetic permeability of the protective film 60 ranges from 500 to 2,000, and a thickness thereof ranges from 0.1 mm to 0.5 mm.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electromagnetic heating assembly, comprising:

a fixing tube with two run-through ends configured to fix an aerosol-forming substrate;

a heating body at least partially extending from a first end of the fixing tube into the fixing tube and inserted into the aerosol-forming substrate in the fixing tube;

an induction coil sleeved on a periphery of the fixing tube and configured to generate electromagnetic induction under an energized state so as to cause the heating body to heat; and a coil fixing cylinder sleeved outside the fixing tube to fix the induction coil, wherein a ratio of a total height of the induction coil to a depth by which the heating body is inserted into the aerosol-forming substrate in the fixing tube ranges from 1:1 to 3:1, and wherein the induction coil is wound on the coil fixing cylinder.

2. The electromagnetic heating assembly of claim 1, wherein the ratio of the total height of the induction coil to the depth by which the heating body is inserted into the aerosol-forming substrate in the fixing tube ranges from 1.2:1 to 1.5:1.

3. The electromagnetic heating assembly of claim 1, wherein the heating body is in a shape of a sheet, wherein the induction coil is in a shape of a spiral, and wherein a ratio of an inner diameter of the induction coil to a width of the heating body ranges from 1.2:1 to 3:1.

4. The electromagnetic heating assembly of claim 1, wherein the induction coil comprises a first sensing region, a second sensing region, and a third sensing region that are arranged sequentially toward the first end of the fixing tube, wherein an average inter-turn spacing of the first sensing region is greater than an average inter-turn spacing of the third sensing region, and wherein the average inter-turn spacing of the third sensing region is greater than an average inter-turn spacing of the second sensing region.

5. The electromagnetic heating assembly of claim 1, wherein a plurality of positioning grooves configured to wind the induction coil to define an inter-turn spacing of the induction coil are provided on an outer side wall of the coil fixing cylinder.

6. The electromagnetic heating assembly of claim 1, further comprising:

a protective film arranged on a periphery of the induction coil, the protective film being configured to increase an inductance and prevent magnetic leakage.

7. The electromagnetic heating assembly of claim 6, wherein a height of the protective film is greater than the total height of the induction coil.

8. The electromagnetic heating assembly of claim 7, wherein the height of the protective film matches a height of the coil fixing cylinder.

9. The electromagnetic heating assembly of claim 6, wherein a magnetic permeability of the protective film ranges from 500 to 2,000.

10. The electromagnetic heating assembly of claim 6, wherein a thickness of the protective film ranges from 0.1 mm to 0.5 mm.

11. The electromagnetic heating assembly of claim 6, wherein the protective film comprises a ferrite film.

12. The electromagnetic heating assembly of claim 1, further comprising:

a base arranged on the first end of the fixing tube, the base being configured to mount the heating body.

13. The electromagnetic heating assembly of claim 1, wherein the fixing tube comprises a tube body with two run-through ends to fix the aerosol-forming substrate, wherein the tube body comprises a first end for the heating body to penetrate and a second end for the aerosol-forming substrate to pass through, wherein an engagement portion arranged protruding out of a peripheral wall of the tube body so as to engage with the coil fixing cylinder is arranged on the second end of the tube body, wherein a gap between the coil fixing cylinder and the engagement portion forms a first air inlet, wherein a second air inlet is provided on the peripheral wall of the tube body close to the first end, and wherein an air inlet channel in communication with the first air inlet and the second air inlet is provided on an inner side of the coil fixing cylinder.

14. An aerosol generation device, comprising:

a shell;

the electromagnetic heating assembly of claim 1, the electromagnetic heating assembly being arranged in the shell; and a power supply component arranged in the shell, the power supply component being configured to energize the electromagnetic heating assembly.

15. The electromagnetic heating assembly of claim 1, wherein an inner diameter of the coil fixing cylinder is greater than an outer diameter of the fixing tube.

* * * * *